United States Patent [19]
Clarke et al.

[11] Patent Number: 5,631,035
[45] Date of Patent: May 20, 1997

[54] METHOD FOR PREPARING SLICED MEAT PORTIONS

[75] Inventors: Edward T. Clarke; Harvey W. Jull, both of Herefordshire; Rebecca S. Stock, Malvern, all of England

[73] Assignee: Sun Valley Poultry Limited, Hereford, United Kingdom

[21] Appl. No.: 427,711

[22] Filed: Apr. 19, 1995

Related U.S. Application Data

[63] Continuation of Ser. No. 159,378, Nov. 29, 1993, abandoned.

[30] Foreign Application Priority Data

Oct. 1, 1991 [GB] United Kingdom ............ 9120867

[51] Int. Cl.$^6$ ............................ A23L 1/315; A23L 1/318
[52] U.S. Cl. ........................ 426/281; 426/513; 426/641; 426/644
[58] Field of Search .................... 426/281, 641, 426/644, 513, 524

[56] References Cited

U.S. PATENT DOCUMENTS

| | | |
|---|---|---|
| 1,011,131 | 12/1911 | Marley et al. . |
| 1,888,542 | 11/1932 | Rosberg . |
| 1,943,019 | 1/1934 | Henney et al. ............ 426/524 |
| 2,128,952 | 9/1938 | Mareta . |
| 2,162,047 | 6/1939 | Allen et al. . |
| 2,418,914 | 4/1947 | Tichy . |
| 2,473,191 | 6/1949 | Bettencourt . |
| 2,489,556 | 11/1949 | Blake . |
| 2,673,156 | 3/1954 | Minder ............ 426/513 |
| 2,687,961 | 8/1954 | Ellis . |
| 2,709,658 | 5/1955 | Buchanan . |
| 2,767,096 | 10/1956 | Schotté . |
| 3,035,508 | 5/1962 | Nelson . |
| 3,060,036 | 10/1962 | Van Dolah . |
| 3,073,701 | 1/1963 | Niblack et al. . |
| 3,076,713 | 2/1963 | Maas ............ 426/272 |
| 3,104,170 | 9/1963 | Mahon . |
| 3,159,489 | 12/1964 | Murphy et al. . |
| 3,211,086 | 10/1965 | Pearce . |
| 3,232,209 | 2/1966 | Earl et al. . |

(List continued on next page.)

FOREIGN PATENT DOCUMENTS

| | | |
|---|---|---|
| AUB44383/75 | 12/1985 | Australia . |
| AUB49909/90 | 2/1991 | Australia . |
| 0245033 | 11/1987 | European Pat. Off. . |
| 2520589 | 5/1982 | France . |
| 1269463 | 5/1968 | Germany . |
| 3-112464 | 5/1991 | Japan ............ 426/281 |
| 3-117468 | 5/1991 | Japan ............ 426/281 |
| 1222684 | 5/1967 | United Kingdom . |
| 1129689 | 10/1968 | United Kingdom . |

OTHER PUBLICATIONS

Smith, "Restructured Meat Products," CSIRO Meat Research Record, p. 7 (1983).

Lampila, "Comparative Microstructure of Red Meat, Poultry and Fish Muscle" Journal of Muscle Foods (1990) pp. 247–267.

Skaara, "The Structure and Properties of Myofibrillar Proteins In Beef, Poultry, and Fish" Journal of Muscle Foods (1990) 269–91.

*Primary Examiner*—Arthur L. Corbin
*Attorney, Agent, or Firm*—Fitch, Even, Tabin & Flannery

[57] ABSTRACT

One or more portions of whole muscle meat are injected with a liquid comprising oil and water, conveniently also containing flavoring materials and/or flavor enhancing materials. The portion or portions are placed in a tray, and conformed generally to a desired final shape by the use of a low pressure, and are frozen to a temperature of minus 18° C. into a condition in which the meat is mechanically rigid. The body of meat is pressed under high pressure into the final shape to produce a block of meat of substantially uniform cross-section. The block may be sliced to provide steaks of uniform thickness, uniform cross-section and uniform density, and may conveniently be vacuum sealed prior to cooking.

12 Claims, 2 Drawing Sheets

U.S. PATENT DOCUMENTS

| | | |
|---|---|---|
| 3,344,731 | 10/1967 | Trees . |
| 3,366,491 | 1/1968 | Schwall . |
| 3,370,959 | 2/1968 | Moore, et al. . |
| 3,370,960 | 2/1968 | Jaccard . |
| 3,387,979 | 6/1968 | Farha . |
| 3,394,017 | 7/1968 | Giacino . |
| 3,399,063 | 8/1968 | Schwall . |
| 3,462,278 | 8/1969 | Mahon . |
| 3,483,004 | 12/1969 | Bauer . |
| 3,499,767 | 3/1970 | Schlamb . |
| 3,507,207 | 4/1970 | Rogers et al. . |
| 3,511,164 | 5/1970 | Strandine et al. . |
| 3,519,442 | 7/1970 | Blomgren et al. . |
| 3,528,820 | 9/1970 | Schwall et al. . |
| 3,551,167 | 12/1970 | Mahon et al. . |
| 3,556,808 | 1/1971 | Panek . |
| 3,556,809 | 1/1971 | Strandine et al. . |
| 3,563,763 | 2/1971 | Schwall et al. . |
| 3,565,639 | 2/1971 | Schack et al. . |
| 3,615,689 | 10/1971 | Malinow et al. . |
| 3,636,857 | 1/1972 | Panek . |
| 3,649,299 | 3/1972 | Scholl . |
| 3,675,567 | 7/1972 | Rejsa et al. . |
| 3,689,283 | 9/1972 | May et al. . |
| 3,695,892 | 10/1972 | Reinke ............... 426/281 |
| 3,852,507 | 12/1974 | Toby ................. 426/513 |
| 4,036,997 | 7/1977 | VerBurg .............. 426/272 |
| 4,210,677 | 7/1980 | Huffman .............. 426/272 |
| 4,260,640 | 4/1981 | Hartmann et al. ...... 426/516 |
| 4,287,218 | 9/1981 | Rich et al. .......... 426/513 X |
| 4,356,205 | 10/1982 | Richards ............. 426/518 |
| 4,363,822 | 12/1982 | Kleptz ............... 426/513 |
| 4,467,497 | 8/1984 | Peterson et al. . |
| 4,474,823 | 10/1984 | Nishikawa et al. ..... 426/643 |
| 4,547,379 | 10/1985 | Moller et al. ........ 426/281 |
| 4,603,053 | 7/1986 | Vegas ................ 426/524 |
| 4,659,578 | 4/1987 | Schlegel ............. 426/418 |
| 4,714,618 | 12/1987 | Matsuda .............. 426/524 |
| 4,812,320 | 3/1989 | Ruzek ................ 426/393 |
| 5,064,667 | 11/1991 | Mally ................ 426/231 |

METHOD FOR PREPARING SLICED MEAT PORTIONS

This application is a continuation, of application Ser. No. 08/159,378 filed Nov. 29, 1993, now abandoned, which is a continuation of international application PCT/GB92/01780 having an international filing date of Sep. 29, 1992 which designates/elects the United States.

BACKGROUND OF THE INVENTION

This invention is concerned with improvements relating to the treatment of meat. The term meat is used herein generically as including animal meat (e.g. beef, lamb, pork, poultry) but excludes fish.

In the catering industry it is highly desirable to provide meat in the form of portions (conventionally termed "steaks") of predetermined size, i.e. having a predetermined cross-sectional area and thickness, to enable the portions to be cooked automatically, and to be charged for at a standard rate.

Conventionally steaks are provided by hand slicing a piece of meat or whole muscle across the grain: however for volume production it is in practical terms impossible to do this economically.

Suggestions have been made to provide blocks of meat in a desired form. For example, portions of meat may be minced and extruded at a temperature in the vicinity of freezing point (e.g. 0° to minus 4° C.) in the form of a cylinder, which may then be sliced. The main disadvantage of this is that the texture of the reconstituted meat is different from that of a conventional steak, and this is readily apparent to a consumer.

Suggestions have been made for the processing of fish, involving the random arrangement of fillets in a container, freezing and then compressing the frozen fillets to a desired shape, which may subsequently be cut into portions (see for example U.S. Pat Nos. 4,474,823 and 3,211,086). However it has been found impossible to apply these known techniques to meat products without destroying the texture and/or flavour of the meat.

It is one of the various objects of this invention to provide for the provision of portions of meat of regular, predetermined size without any significant disruption to the structure of the meat.

SUMMARY OF THE INVENTION

According to this invention there is provided a method of providing a portion of meat of predetermined size, involving the steps:

[a] injecting a body of meat with an appropriate liquid;
[b] freezing the body of meat;
[c] pressing the frozen body into a desired shape under pressure; and
[d] slicing the frozen body into portions of desired size.

According to this invention there is also provided a method of providing a portion of meat of predetermined size, involving the steps:

a) forming a body of meat into an initial shape;
b) freezing the body of meat to a temperature at which it is mechanically rigid;
c) pressing the frozen body into a final shape under high pressure; and
d) slicing the frozen body into portions of desired size.

According to this invention there is provided a method of providing a portion of meat of predetermined size, involving the steps:

[a] injecting a body of meat with an appropriate liquid;
[b] freezing the body of meat;
[c] pressing the frozen body into a desired shape under pressure; and
[d] slicing the frozen body into portions of desired size.

Advantageously the body of meat is injected with oil and water, preferably in the form of an emulsion, the oil conveniently being a butter oil or a butter-flavoured soya oil. If desired, other materials may be injected into the meat at this stage, including flavouring materials, such as salt, sugar, and/or flavour-enhancing materials.

Preferably the quantity of liquid injected into the body of meat falls within the range of 3% to 25% of the original weight of the body of meat, preferably within the range 5% to 20% and more preferably within the range 10% to 16%.

Preferably the body of meat is tenderised prior to freezing using blades which penetrate the connective tissue without significantly impairing the whole muscle nature.

Preferably prior to freezing, the body of meat is subjected to a process in which myosin is released, such as by subjecting the body of meat to a tumbling operation. In this manner, the injected fluid is caused to be dispersed generally uniformly around the body of meat, and in particular in the connected tissue between muscles.

Preferably the tumbling operation is carried out at a reduced pressure, preferably less than $3.3 \times 10^4$ Pa (i.e. a vacuum of greater than 29" Hg) and preferably at a pressure of less than $1.6 \times 10^4$ Pa (a vacuum greater than 25" Hg). In this manner tendency for air to remain in or become entrained within the body of meat is reduced.

The period for tumbling will vary with the nature of the meat, and the size of the portions. Where a large body of meat is utilised, and the requirement for the liberation of myocin is reduced, tumbling for a period of time within the range 30 minutes to 1 hour may be sufficient, whilst if several small pieces are utilised, which require to be adhered together in subsequent stages of the process, tumbling for a longer period of time may be desired, e.g. in the range 2 to 6 hours.

Preferably prior to the step of freezing, the body of meat muscle is formed generally into an initial shape in which the body of meat is retained during freezing, such that the body of meat is maintained in said shape when frozen. Preferably the initial forming involves placing the body of meat in a mould and applying a low pressure insufficient to cause any significant disruption of the muscle tissue of the body of meat, conveniently within the range 0.5 p.s.i. to 50 p.s.i. ($3.45 \times 10^3$ Pa to $3.45 \times 10^5$ Pa preferably within the range 1 p.s.i. to 10 p.s.i. ($6.9 \times 10^3$ Pa to $6.9 \times 10^4$ Pa) advantageously between 3 p.s.i. and 8 p.s.i. ($2.07 \times 10^4$ Pa to $5.52 \times 10^4$ Pa).

Preferably the initial forming operation is carried out above 0° C., conveniently at room temperature.

Preferably the step of freezing involves deep freezing, i.e. to a temperature of within the range −5° C. to −20° C., preferably within the range −10° C. to −15° C. Preferably the time taken in the freezing is such as to ensure that the frozen body of meat is mechanically rigid, substantially throughout. Desirably the speed of freezing is such as to reduce the size of ice crystals formed within the body of meat.

Conveniently the pressing process is carried out at high pressure, preferably within the range 500 p.s.i. to 10000 p.s.i. ($3.45 \times 10^6$ Pa to $6.9 \times 10^7$ Pa) preferably in the range 750 p.s.i. to 4000 p.s.i. ($5.17 \times 10^6$ Pa to $2.76 \times 10^7$ Pa). Preferably the pressure which is utilised, in relation to the temperature of the frozen block of meat, is such as to produce liquification of the ice within of the muscle tissue, allowing slippage of the muscle fibres across one another without any significant disruption of the muscle structure. On release of the high pressure the liquid re-freezes and the body of meat retains the shape into which it has been finally formed, this being assisted by the myocin released during tumbling. Advantageously the pressure is released relatively quickly, e.g. within 3 seconds, to ensure reduced ice-crystal growth during re-freezing.

Desirably the final shape of the block is that of a conventionally-sliced steak i.e. having at least one peripheral surface which is curved in a non-circular profile.

Preferably the low pressure forming is carried out in moulds and forms the body of meat into the shape close to the final, desired shape, differing therefrom preferably by no more than 5 mm preferably by 2 mm or less. In this way the body of meat may be formed into its final shape with minimal impairment of the muscle structure, ensuring that the body of meat when formed and cooked retains the texture of a body of untreated meat.

The high pressure forming may be carried out in the same mould as the low pressure forming is carried out, blot preferably on completion of freezing the body of meat is removed from the low-pressure forming mould and is subjected to the final high-pressure shaping operation at a later stage using a different mould.

A block of meat so treated is preferably whole muscle meat, i.e. a single muscle, and may be constituted from meat derived from a single animal carcase. Alternatively, and particularly in relation to smaller animals such as chicken, several portions of muscle meat derived from different animals of the same species may be frozen together to afford the block.

Conveniently subsequent to slicing, the slices are cooked, and re-cooled to provide a saleable food product, conveniently being sold in a sealable bag or pouch. Thus, subsequent to slicing, the slices may be placed in heat-processable plastic bags, which are then vacuum sealed, prior to cooking.

According to this invention there is also provided a method of providing a portion of meat of predetermined size, involving the steps:

a) forming a body of meat into an initial shape;
 b) freezing the body of meat to a temperature at which it is mechanically rigid;
 c) pressing the frozen body into a final shape under high pressure; and
 d) slicing the frozen body into portions of desired size.

Preferably the method set out in the last preceding paragraph also includes the steps:

e) injecting the body of meat with a liquid, preferably comprising water and oil;
 f) tenderising the body of meat;
 g) tumbling the body of meat, preferably under a reduced pressure, said steps e) to g) being carried out prior to the step a).

According to this invention there is also provided a meat steak, the steak having been produced by a method involving the steps of forming a portion of muscle meat in a mould into an initial shape close to a desired final shape, reducing the temperature of the formed portion such that the portion is mechanically rigid, pressing the meat into a desired final shape under pressure, and slicing the frozen meat into steaks, said meat steak being characterised by the absence of any significant disruption to the muscle tissue, and the absence in the frozen portion of any large ice crystals.

BRIEF DESCRIPTION OF THE DRAWINGS

There will now be given a detailed description, to be read with reference to the accompanying drawings, of a preferred embodiment which has been selected for the purposes of illustrating the invention by way of example.

In the accompanying drawings.

The preferred embodiments of the invention are methods for the provision of steaks of meat of generally predetermined size and weight, involving the formation of a block or slab of meat of uniform cross-section, whereby, when the block or slab is sliced at constant thickness, a steak of uniform, predetermined size and thickness is produced, having been sliced across the grain.

EXAMPLES

Example 1

In the performance of the first embodiment, a portion P1, of whole, single muscle meat derived from turkey is injected with an emulsion of butter oil and water, conveniently also containing salt, sugar and emulsifier, in an amount approximately 15% by weight of meat. The body was then tenderised, and subjected to a tumbling operation at 6 rpm for a period of 40 minutes at a pressure of $1.5 \times 10^4$ Pa. The portion is then placed in a tray T, and conformed to a generally rectangular shape and frozen to a temperature of minus 18° C. into a condition in which the portion is mechanically rigid. The block produced by freezing the portions P1 may then be removed from the tray T, and bagged and retained frozen until desired for further use.

Figure 1:
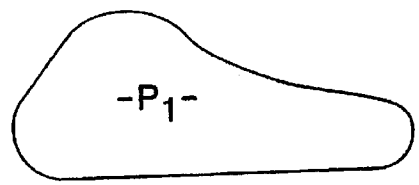
FIGS. 1 and 2 show stages in a low pressure forming operation.
Figure 2:
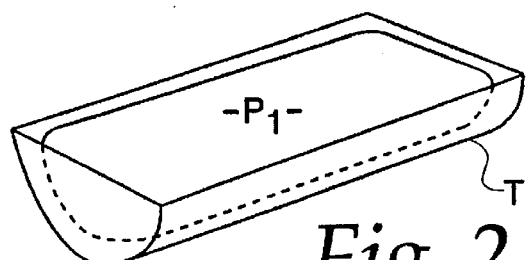
Figure 3:
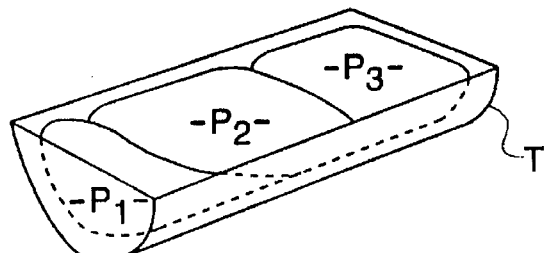
FIG. 3 shows a low pressure forming operation utilising several portions of meat.
Figure 6:
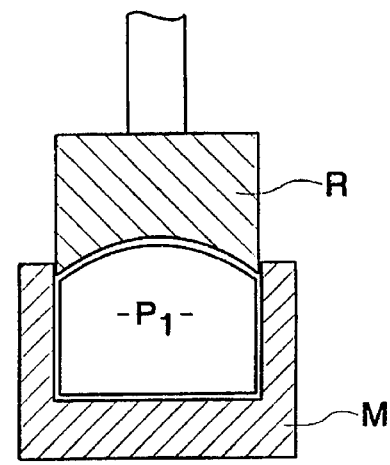
FIG. 6 illustrates a high pressure forming mould.

The partially-formed portion thus provided is placed in a high pressure mould (FIG. 6) in which it is formed into a final desired shape, whilst retained at its low temperature, at a high pressure of between 500 and 10,000 p.s.i., preferably between 1,000 and 5,000 p.s.i., for a period of about 7.5 seconds. Whilst the high pressure is applied to the portion, the liquid de-freezes, particularly at the interface of the muscle tissue, allowing the muscle tissues to slip one across the other, conforming the portion to the shape of the mould without any significant disruption of the muscle tissue. Desirably the change in shape produced by the high pressure forming stage is not great, and preferably involves a movement of no more than 5 mm of any part of the meat, and preferably less than that, e.g. 2 mm. On release of pressure there is an immediate re-freezing of the liquid within the body, and because of the speed of re-freezing, this results in the formation of very small ice crystals.

Figure 7:
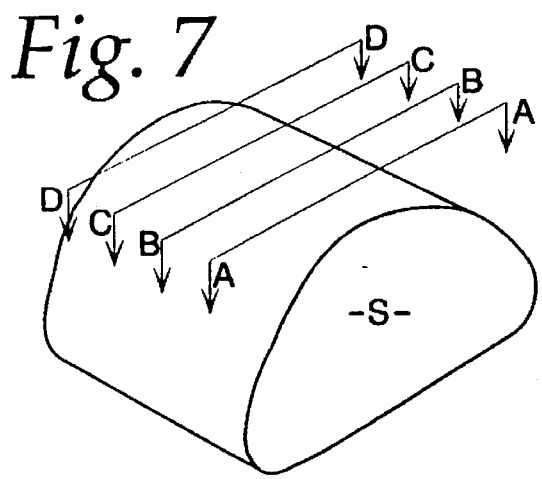
FIGS. 7 and 8 illustrate the cutting of a formed block into individual steaks.
Figure 8:
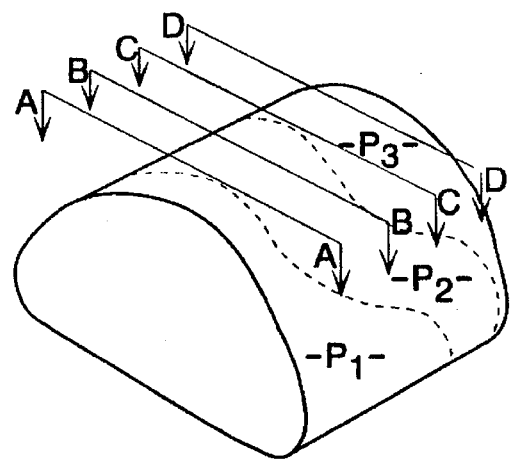

On conclusion of the pressing operation the block is removed from the high pressure mould, and is then subjected to a slicing operation (shown in FIG. 7) during which it is sliced in planes AA, BB, CC, etc. to produce portions of meat in the form of steaks having the uniform cross section as shown in FIG. 7 (i.e. the shape of the high pressure mould) and having a thickness determined by the thickness of the cut.

The slicing operation may be carried out at a temperature raised somewhat about the −18° C. at which the moulding operation takes place, but preferably slicing is carried out without any elevation in temperature being effected.

The slices may then be vacuum sealed in individual bags, and retained chilled or frozen until the product is cooked.

Alternatively the steak may be cooked directly after being sliced, whilst in an individual pack, such as in a continuous oven or in a water bath, and frozen again or chilled, being reheated prior to being consumed, such as in a clam-shell heater m impart an aesthetically pleasing colour to the surface of the steak.

In either event, during cooking of the steak, the shape relaxes, and the steak adopts the form of a conventional whole-muscle steak.

Example 2

Portions of whole muscle turkey meat were first injected with a marinade solution to approximately 16% of their original weight, with the brine composition comprising 77.9% water, 6.7% salt, 6.7% soya oil, 7.2% turkey flavour (salt, wheat starch, chicken fat, beef extract and alpha tocopherol, and 1.5% sodium caseinate, said percentages being by weight. An injector equipped with bayonet-typed tenderising needles was used to effect tenderising of the meat.

The injected/tenderised portions were tumbled under a low pressure of $1.5 \times 10^4$ Pa or lower for 5 hours at 6 rpm. The tumbled portions were separated and graded into various weight categories to accommodate various sizes of moulds.

Figure 5:
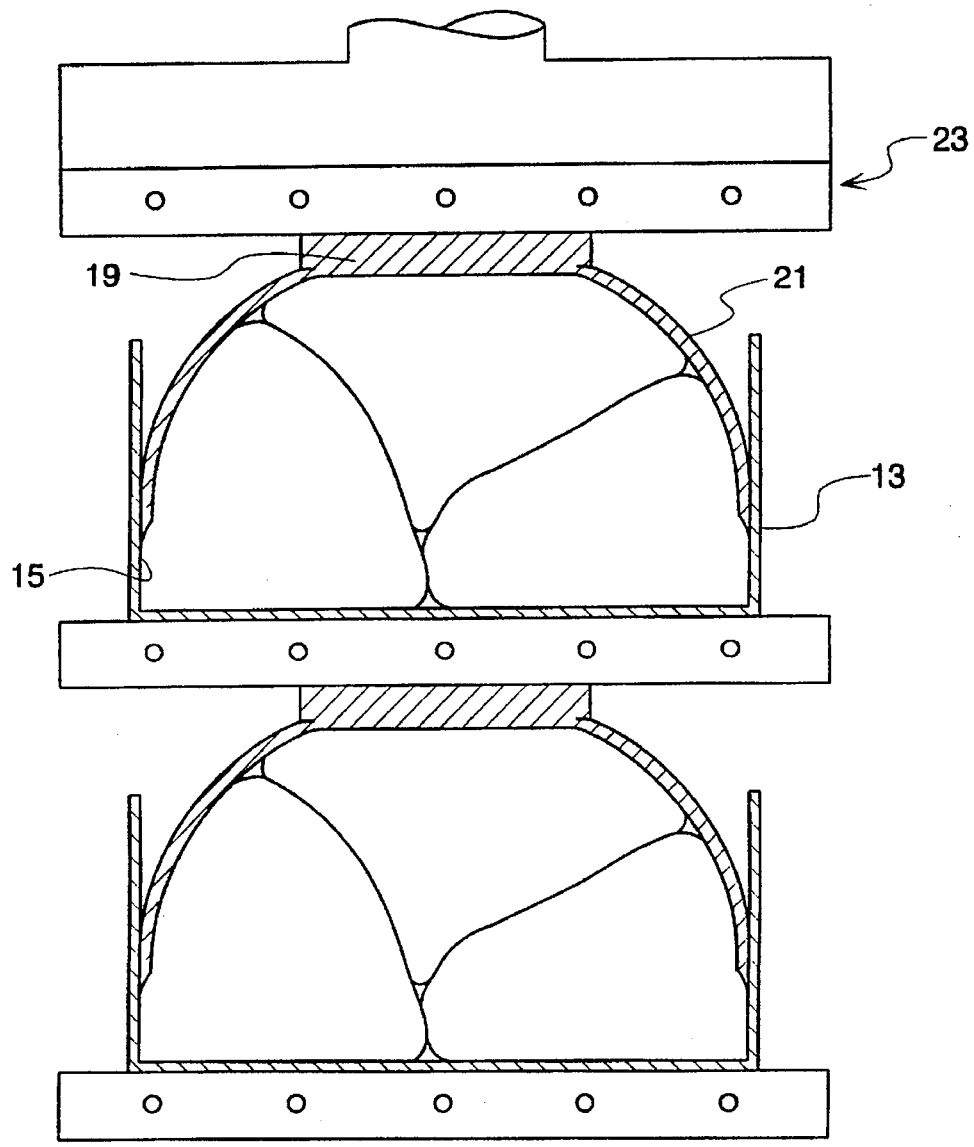
FIGS. 4 and 5 show an alternative arrangement for low pressure forming.
Figure 4:
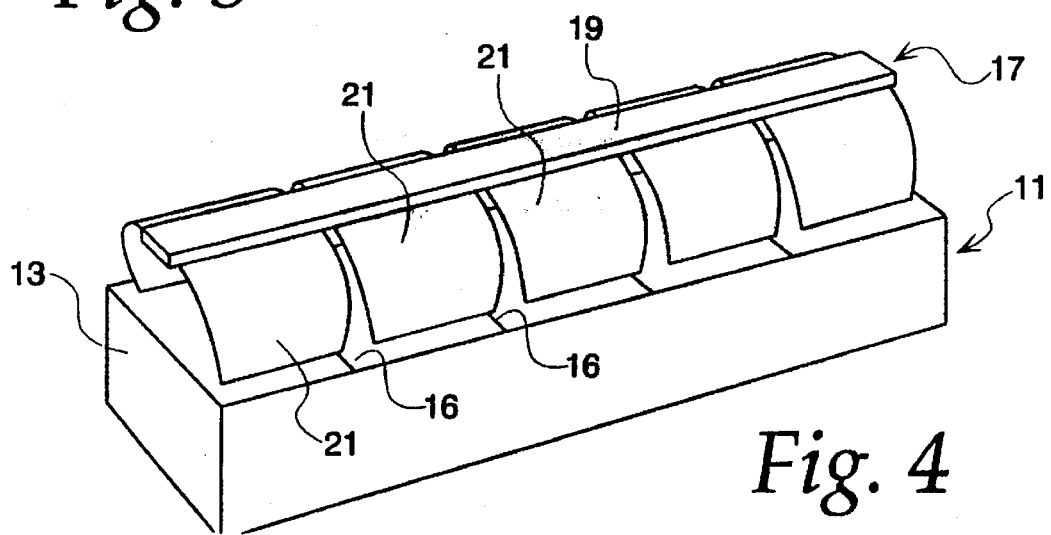

A mould assembly is used, comprising a base member 13 in the form of an open-topped box, divided into said compartments 15 by lateral partitions 16, and a presser member 17 comprising a top plate 19 connecting a plurality of dome-shaped presser elements 21 shaped to fit into the compartments 15 (see FIGS. 4 and 5). The graded portions are fitted into the moulds in close proximity to fill the moulds, with care being taken to ensure alignment of the grain of the portions. A plurality of filled mould assemblies were placed into a plate-freezer 23, and subjected to a relatively low pressure of between 1 and 5 p.s.i. to conform the portions to the shape of the compartments without causing any significant disruption of the muscle tissue and reduced in temperature by the plate-freezer to a temperature of about $-18°$ C. ($0°$ F.) over a period of about 4 hours.

The partially-formed portions of Example 2 are placed in a high pressure mould (FIG. 6) in which they are formed into a final desired shape, whilst retained at its low temperature at a high pressure of between 500 and 10,000 p.s.i. ($3.45 \times 10^6$ to $6.9 \times 10^7$ Pa) preferably about 3,000 p.s.i., for a period of about 7.5 seconds.

During high pressure forming the liquid, particularly at the interface of the muscle tissue, unfreezes, allowing the muscle fibres to slip relative to one another as the portion is deformed into its a final, desired shape. However it is to be appreciated that desirably final shaping involves only a relatively small movement (e.g. less than 5 mm) from the initially formed shape, otherwise disruption to the muscle fibres may occur which will provide an impairment in the quality of the meat.

The greater amount of myocin released by the increased tumbling period to which the portions of Example 2 are subjected, compared with the larger portions of Example 1, ensures a firm bond between adjacent portions of meat, and assists the body of meat to behave as a single body of whole muscle meat during subsequent treatment.

The following stages to which the portions of Example 2 are subject are similar to those set out in relation to Example 1.

Example 3

Example 3 is similar in general terms to Example 2 above, but describes the invention in relation to red meat, specifically beef.

Top loin and clod (chuck) portions of beef, all weighing between 2.5 and 2.7 pounds, were tenderised and subsequently injected with a brine solution. The brine composition was 82.5 wt % water, 5.8% salt, 35% dextrose, 15% sodium caseinate, and 6.7% soy oil. The roasts were then tumbled for 40 minutes at 6 rpm under 26" Hg vacuum. The portions were then placed in a mould and formed generally to the shape of the mould under a relatively low pressure of 5 p.s.i., and whilst retained in the mould were subjected to a temperature of $-15°$ C. until they were rigid throughout. While rigidly frozen, the portions were transferred to a high pressure mould and pressed for seven seconds at 1000 p.s.i., the portions being conformed to the shape of the high pressure mould. The portions were then sliced into steaks to a thickness of 0.69 inches (15 mm), into an average of 13 steaks per portion.

The steaks were broiled and yielded a cooked product that was very juicy and had great flavour.

Whilst the invention has been described above primarily in relation to white meat (poultry or chicken) and beef, it is of course to be appreciated that the invention has similar applicability to other meat, such as pork, lamb, etc.

The features disclosed in the foregoing description, or the following claims, or the accompanying drawings, expressed in their specific forms or in the terms or means for performing the desired function, or a method or process for attaining the disclosed result, may, separately or in any combination of such features, be utilised for realising the invention in diverse forms thereof.

We claim:

1. A method of providing portions of meat of predetermined size comprising:
    (a) injecting a body of meat with a liquid comprising oil and water;
    (b) forming the injected body of meat into an initial shape;
    (c) freezing the shaped body of meat at a rate effective to limit the size of ice crystals formed within the body of meat; then
    (d) pressing the frozen body of meat into a desired shape under a pressure of 750 to 4000 psi, wherein the pressure is effective for producing liquification of ice in the body of meat such that muscle fibers in the body of meat are allowed to slip across one another without any significant disruption of muscle structure;
    (e) quickly releasing the pressure applied in step (d) to re-freeze the ice liquified in step (d) and to limit ice-crystal growth during re-freezing; and then
    (f) slicing the frozen body of meat into portions of desired size, wherein the method provides portions of meat without significant disruption of the muscle structure of the meat and which portions retain the texture of untreated meat.

2. A method according to claim 1 wherein the body of meat is injected with a liquid comprising a water and oil emulsion.

3. A method according to claim 2 wherein the oil used is butter oil.

4. A method according to claim 1 wherein the body of meat is tenderized prior to freezing.

5. A method according to claim 1 wherein, prior to the step of freezing, the meat is formed generally into a shape in a mould in which the shape is retained during freezing.

6. A method according to claim 4 wherein said forming involves subjecting the meat to a pressure within the range of from about 0.5 to about 50 p.s.i.

7. A method according to claim 1 wherein the step of freezing involves deep freezing to a temperature within the range of from about −5° C. to about 20° C. to the point at which the body of meat is substantially mechanically rigid.

8. A method according to claim 1 wherein the body of meat is pressed into the shape of a conventionally-sliced steak.

9. A method according to claim 1 wherein the body of meat is whole muscle meat derived from a single animal carcass.

10. A method according to claim 1 wherein the body of meat is derived from several portions of muscle meat derived from different animals of the same species.

11. A method according to claim 1 wherein subsequent to slicing, the slices are cooked, and re-cooled to provide a saleable product.

12. A method according to claim 1 wherein the pressure applied in step (d) is released in step (e) in less than about 3 seconds.

* * * * *